United States Patent
Wu et al.

(10) Patent No.: US 10,001,666 B2
(45) Date of Patent: Jun. 19, 2018

(54) LIQUID CRYSTAL GRATING, METHOD OF MANUFACTURING THE SAME AND DISPLAY APPARATUS

(71) Applicants: BOE TECHNOLOGY GROUP CO., LTD., Beijing (CN); Beijing BOE Optoelectronics Technology Co., Ltd., Beijing (CN)

(72) Inventors: Xiaojuan Wu, Beijing (CN); Hailin Xue, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 154 days.

(21) Appl. No.: 15/130,322

(22) Filed: Apr. 15, 2016

(65) Prior Publication Data
US 2016/0370615 A1 Dec. 22, 2016

(30) Foreign Application Priority Data
Jun. 16, 2015 (CN) .......................... 2015 1 0334167

(51) Int. Cl.
*G02F 1/1334* (2006.01)
*C09K 19/56* (2006.01)
(Continued)

(52) U.S. Cl.
CPC ............ *G02F 1/1334* (2013.01); *C09K 19/56* (2013.01); *G02B 27/2214* (2013.01); *C09K 2019/546* (2013.01); *G02F 2001/13345* (2013.01)

(58) Field of Classification Search
None
See application file for complete search history.

(56) References Cited

U.S. PATENT DOCUMENTS

| 8,113,901 B1* | 2/2012 | Yeh | G02B 5/1857 445/24 |
| 2003/0193709 A1* | 10/2003 | Mallya | G02F 1/1334 359/245 |

(Continued)

FOREIGN PATENT DOCUMENTS

| CN | 101225308 A | 7/2008 |
| CN | 102071031 A | 5/2011 |

(Continued)

OTHER PUBLICATIONS

First Chinese Office Action, for Chinese Patent Application No. 201510334167.6, dated Jun. 26, 2017, 17 pages.

*Primary Examiner* — Ryan Crockett
(74) *Attorney, Agent, or Firm* — Kinney & Lange, P.A.

(57) ABSTRACT

The disclosure discloses a liquid crystal grating and a method of manufacturing the same and a display apparatus, and belongs to the field of display apparatus. The liquid crystal grating comprises a polymer network layer, which comprises liquid crystal and a polymer network allowing the liquid crystal to arrange in a preset manner by the anchoring effect. The polymer network is a polymer network formed by the polymerization of a reactive monomer and a photoinitiator. The polymer network layer may further comprise a copolymer used for entangling the polymer network and adhering the polymer network to the first transparent electrode. The liquid crystal grating may be used in naked-eye 3D display.

20 Claims, 7 Drawing Sheets

(51) Int. Cl.
  *G02F 1/1335*  (2006.01)
  *G02F 1/1343*  (2006.01)
  *G02B 27/22*  (2018.01)
  *C09K 19/54*  (2006.01)

(56) References Cited

U.S. PATENT DOCUMENTS

| | | | | |
|---|---|---|---|---|
| 2005/0254752 | A1* | 11/2005 | Domash | G02F 1/313 385/37 |
| 2007/0131902 | A1* | 6/2007 | Lee | C09K 19/54 252/299.01 |
| 2007/0183020 | A1* | 8/2007 | Hikmet | G02F 1/13718 359/279 |
| 2015/0301249 | A1* | 10/2015 | Pau | G02B 5/3016 349/124 |
| 2015/0362802 | A1* | 12/2015 | Wu | G02F 1/133711 349/106 |
| 2016/0011428 | A1* | 1/2016 | Li | G02B 27/2214 359/275 |
| 2016/0340585 | A1* | 11/2016 | Wu | C09K 19/544 |
| 2016/0370657 | A1* | 12/2016 | Wu | C09K 19/2021 |
| 2016/0370679 | A1* | 12/2016 | Li | G02F 1/153 |
| 2016/0377907 | A1* | 12/2016 | Wu | G02F 1/13731 349/139 |
| 2017/0108701 | A1* | 4/2017 | Wu | G02B 27/2214 |
| 2017/0139222 | A1* | 5/2017 | Yang | G02B 27/2228 |

FOREIGN PATENT DOCUMENTS

| | | | |
|---|---|---|---|
| CN | 102516498 | * | 6/2012 |
| CN | 102516498 A | | 6/2012 |
| CN | 102879911 A | | 1/2013 |
| CN | 104530284 A | | 4/2015 |
| CN | 104656338 A | | 5/2015 |

* cited by examiner

LIQUID CRYSTAL GRATING, METHOD OF MANUFACTURING THE SAME AND DISPLAY APPARATUS

TECHNICAL FIELD

At least one embodiment of the disclosure relates to the field of display apparatus, and particularly to a liquid crystal grating and a method of manufacturing the same and a display apparatus.

BACKGROUND

The naked-eye 3D technology refers to a display technology wherein two images having a parallax are directly seen by left and right eyes from a display screen without any tool and the two images are transmitted to the brain to generate an image having a stereo perception. In the naked-eye 3D technology, naked-eye 3D liquid crystal display technologies, which combine naked-eye 3D and liquid crystal display, are hot spots of current studies.

Naked-eye 3D displays may be divided into barrier type and lens type naked-eye 3D displays. Since the barrier type naked-eye 3D display may be compatible with panel display screen techniques such as liquid crystal display screens, organic electroluminescent screens, or the like, it has been widely investigated. The barrier type naked-eye 3D display generally superimposes a liquid crystal grating on a light-outgoing side surface of a display panel. This does not only achieve naked-eye 3D but may also achieve the mode switch between 3D display and 2D display.

A current liquid crystal grating is generally a twisted nematic (TN) type liquid crystal grating, which is composed of an upper substrate, a lower substrate, and a liquid crystal layer between the two substrates. In a twisted nematic type liquid crystal grating, the long axes of the liquid crystal molecules are continuously twisted. There are a strip electrode and a plane electrode on the upper substrate and the lower substrate respectively, and the strip electrode and the plane electrode are provided respectively on surfaces, which are toward the liquid crystal layer, of the upper substrate and the lower substrate. The electric field generated by the strip electrode and the plane electrode may change the direction of liquid crystal in the liquid crystal layer so as to allow the liquid crystal grating to be switched between 3D display and 2D display.

As for liquid crystal gratings used for naked-eye 3D display, the requirements for improvements still exist.

Also, when a superimposed individual liquid crystal grating is used, since one liquid crystal grating is required to be superimposed on a display panel, the thickness of the entire display device increases and the loss of transmittance upon 2D display is relatively high, such that the effect of display is affected.

SUMMARY

Embodiments of the disclosure provides a liquid crystal grating, which may perform the function of the switch between 3D display and 2D display for use in naked-eye 3D display and a method of manufacturing the same and a display apparatus. The liquid crystal grating allows liquid crystal to arrange in a preset manner being based on the liquid crystal-anchoring effect of the polymer network, rather than being based on twisted nematic type.

The technical solutions are as follows.

In a first aspect, an embodiment of the disclosure provides a liquid crystal grating used for a naked-eye 3D display apparatus, wherein the liquid crystal grating comprises:

a first transparent electrode having a grating structure formed on a first substrate, a polymer network layer laying over the first transparent electrode, and a second substrate laying over the polymer network layer, wherein the second substrate has a second transparent electrode provided corresponding to the first transparent electrode on the side toward the polymer network layer;

wherein the polymer network layer comprises liquid crystal and a polymer network allowing the liquid crystal to arrange in a preset manner by the anchoring effect, wherein the polymer network is a polymer network formed by the polymerization of a reactive monomer and a photoinitiator.

In another implementation of the embodiment of the disclosure, the reactive monomer is an epoxy resin monomer, and the photoinitiator is a cationic photoinitiator.

In another implementation of the embodiment of the disclosure, the epoxy resin monomer is one or a mixture of several of ethylene glycol diglycidyl ether, diglycidyl ether bisphenol F, trimethylolpropane triglycidyl ether, and pentaerythritol glycidyl ether.

In an implementation of the embodiment of the disclosure, the polymer network layer further comprises a copolymer used for entangling the polymer network and adhering the polymer network to the first transparent electrode.

In another implementation of the embodiment of the disclosure, the copolymer is an ethylene-vinyl acetate copolymer.

In another implementation of the embodiment of the disclosure, the liquid crystal is positive liquid crystal, and the polymer network allows the positive liquid crystal to be randomly arranged by the anchoring effect; or the liquid crystal is negative liquid crystal, and the polymer network allows the negative liquid crystal to be vertically arranged by the anchoring effect.

In another implementation of the embodiment of the disclosure, the polymer network layer has a thickness of 2-20 μm.

In a second aspect, an embodiment of the disclosure further provides a method of manufacturing a liquid crystal grating, wherein the method comprises:

manufacturing a first transparent electrode having a grating structure on a first substrate;

laying a polymer network layer over the first transparent electrode, wherein the polymer network layer comprises liquid crystal, a polymer network allowing the liquid crystal to arrange in a preset manner by the anchoring effect, and optionally a copolymer used for entangling the polymer network and adhering the polymer network to the first transparent electrode, wherein the polymer network is formed by the polymerization of a reactive monomer and a photoinitiator; and laying a second substrate over the polymer network layer to form a liquid crystal grating, wherein the second substrate has a second transparent electrode provided corresponding to the first transparent electrode on the side toward the polymer network layer.

In an implementation of the embodiment of the disclosure, the laying a polymer network layer over the first transparent electrode comprises:

coating a layer of a first mixture on the first transparent electrode, which comprises a reactive monomer, a photoinitiator, a positive liquid crystal, and optionally a copolymer;

heating the first substrate coated with the first mixture to the clear point temperature of the positive liquid crystal or more to allow the positive liquid crystal to be randomly arranged; and irradiating the first mixture with ultraviolet to allow an ionic polymerization reaction of a reactive monomer and a photoinitiator to form a polymer network, so as to anchor the arrangement of the positive liquid crystal to obtain the polymer network layer.

In another implementation of the embodiment of the disclosure, the irradiating the first mixture with ultraviolet comprises:

irradiating the first mixture with ultraviolet having a light irradiation intensity of 3-25 mW/cm$^2$ for 20-40 min.

In another implementation of the embodiment of the disclosure, the method further comprises:

uniformly mixing a reactive monomer, a photoinitiator, and a positive liquid crystal to obtain a second mixture, wherein the masses of reactive monomer, the photoinitiator, and the positive liquid crystal constitute 20-60%, 3-5%, and 35-77% of the mass of the second mixture, respectively; and uniformly mixing the second mixture and a copolymer at a mass ratio of 3/7-2/8 to obtain the first mixture.

In another implementation of the embodiment of the disclosure, the laying a polymer network layer over the first transparent electrode comprises:

coating a layer of a vertical orientating agent on the first transparent electrode;

coating a layer of a third mixture on the first transparent electrode coated with a vertical orientating agent, wherein the third mixture comprises a reactive monomer, a photoinitiator, a negative liquid crystal, and optionally a copolymer; and irradiating the third mixture with ultraviolet to allow an ionic polymerization reaction of a reactive monomer and a photoinitiator to form a polymer network, so as to anchor the vertical arrangement of the negative liquid crystal to obtain the polymer network layer.

In another implementation of the embodiment of the disclosure, the irradiating the third mixture with ultraviolet comprises:

irradiating the third mixture with ultraviolet having a light irradiation intensity of 3-25 mW/cm$^2$ for 20-40 min.

In another implementation of the embodiment of the disclosure, the method further comprises:

uniformly mixing a reactive monomer, a photoinitiator, and a negative liquid crystal to obtain a fourth mixture, wherein the masses of reactive monomer, the photoinitiator, and the negative liquid crystal constitute 20-60%, 3-5%, and 35-77% of the mass of the fourth mixture, respectively; and uniformly mixing the fourth mixture and a copolymer at a mass ratio of 3/7-2/8 to obtain the third mixture.

In another implementation of the embodiment of the disclosure, the reactive monomer is an epoxy resin monomer, and the photoinitiator is a cationic photoinitiator.

In another implementation of the embodiment of the disclosure, the epoxy resin monomer is one or a mixture of several of ethylene glycol diglycidyl ether, diglycidyl ether bisphenol F, trimethylolpropane triglycidyl ether, and pentaerythritol glycidyl ether.

In another implementation of the embodiment of the disclosure, the copolymer is an ethylene-vinyl acetate copolymer.

In another implementation of the embodiment of the disclosure, the polymer network layer has a thickness of 2-20 μm.

In another implementation of the embodiment of the disclosure, the first substrate is a light-outgoing side surface of a display device to allow the liquid crystal grating and the display device to integrally form a barrier type naked-eye 3D display apparatus, which is capable of switching between 2D/3D display modes.

In a third aspect, an embodiment of the disclosure further provides a barrier type naked-eye 3D display apparatus, which is capable of switching between 2D/3D display modes, wherein the display apparatus comprises a display device and the liquid crystal grating according to the first aspect of the disclosure on the display device.

In an implementation of the embodiment of the disclosure, the first substrate of the liquid crystal grating is the light-outgoing side surface of the display device.

In another implementation of the embodiment of the disclosure, the display is a liquid crystal panel, wherein the display apparatus further comprises a first polarizer and a second polarizer, and the liquid crystal panel and the liquid crystal grating are sandwiched between the first polarizer and second polarizer.

The advantageous effects brought about by the technical solutions provided by embodiments of the disclosure are as follows.

By using the polymer network, which allows the liquid crystal to arrange in a preset manner by the anchoring effect, in this polymer network layer, it is ensured that the ordering of liquid crystal in the liquid crystal grating may be changed when electricity is applied on and the switch between 3D display and 2D display is achieved.

Advantageously, the use of copolymer is for entangling the polymer network described above on the one hand, and for directly adhering the polymer network to a first transparent electrode on the other hand, which increases the fixation between the polymer network and the transparent electrode.

More advantageously, the liquid crystal grating of the disclosure is suitable to be directly and integrally manufactured on a display device, and the supply of an individual substrate may not be required to carry out an individual manufacture of a liquid crystal grating, such that one substrate is waived, the thickness of the liquid crystal grating is reduced, the problem of relatively high loss of transmittance upon 2D display is avoided, and the effect of display is improved.

BRIEF DESCRIPTION OF THE DRAWINGS

In order to illustrate the technical solutions in embodiments of the disclosure more clearly, figures required for describing the embodiments will be simply introduced below. It is apparent that the figures described below are merely some embodiments of the disclosure, and other figures may be further obtained by ordinary skilled person in the art according to these figures without exerting inventive work.

DETAILED DESCRIPTION

In order to enable objects, technical solutions, and advantages of the disclosure to be more clear, embodiments of the disclosure will be further described in details in conjunction with accompanying drawings.

Figure 1:
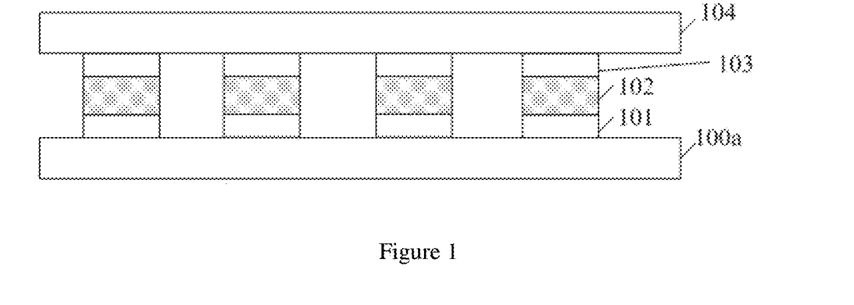
FIG. 1 is a structural schematic diagram of a liquid crystal grating provided in an embodiment of the disclosure.

FIG. 1 provides a structural schematic diagram of a liquid crystal grating according to an embodiment of the disclosure. With reference to FIG. 1, this liquid crystal grating comprises:

a first transparent electrode 101 having a grating structure formed on a first substrate 100a, a polymer network layer 102 laying over the first transparent electrode 101, and a second substrate 104 laying over the polymer network layer 102, and the second substrate 104 has a second transparent electrode 103 provided corresponding to the first transparent electrode 101 on the side toward the polymer network layer 101.

Here, the first transparent electrode 101 having a grating structure is formed by etching off a part of a transparent electrode layer laying over the first substrate 100a, and may be a strip electrode or a block electrode. Accordingly, the second transparent electrode 103 described above may be a strip electrode or a block electrode.

Figure 2:
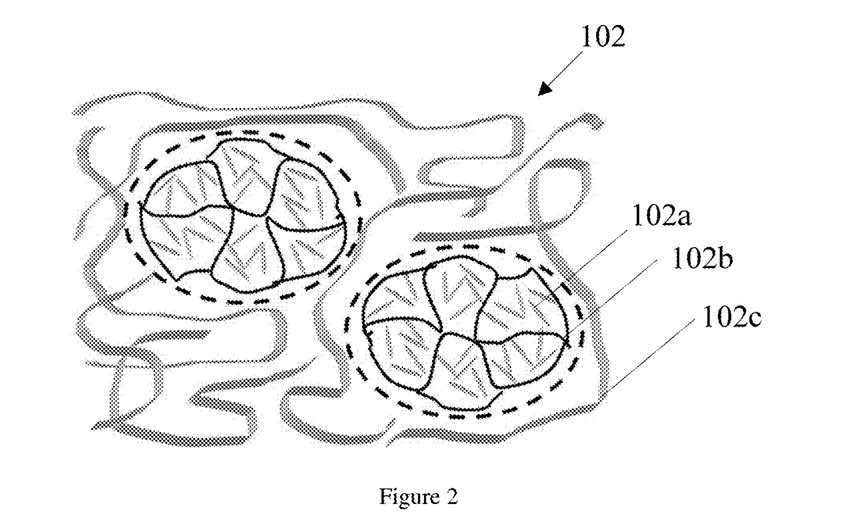
FIG. 2 is a structural schematic diagram of a polymer network layer provided in an embodiment of the disclosure.

The polymer network layer of the disclosure comprises liquid crystal and a polymer network allowing the liquid crystal to arrange in a preset manner by the anchoring effect. Here, the polymer network 102b is a polymer network formed by polymerization of a reactive monomer and a photoinitiator. The polymer network layer further preferably comprises a copolymer used for entangling the polymer network and adhering the polymer network to the first transparent electrode. However, when the polymer network structure formed is stable and is well bonded to the transparent electrode, copolymers may not be used.

FIG. 2 provides a structural schematic diagram of a preferable polymer network layer described above. As shown in FIG. 2, the polymer network layer 102 comprises liquid crystal 102a, a polymer network 102b allowing the liquid crystal 102a to arrange in a preset manner by the anchoring effect, and a copolymer 102c used for entangling the polymer network 102b and adhering the polymer network to the first transparent electrode 101.

In this polymer network layer, the polymer network allows the liquid crystal to arrange in a preset manner by the anchoring effect to ensure that the ordering of liquid crystal in the liquid crystal grating may be changed when electricity is applied on and the switch between 3D display and 2D display is achieved. Herein, the "preset manner" refers to the arrangement manner of liquid crystal after being anchored by the polymer network, and for example, it may be random arrangement or vertical arrangement with respect to the substrate. The copolymer is used for entangling the polymer network described above on the one hand, and directly adhering the polymer network to a first transparent electrode on the other hand.

More particularly, the reactive monomer may be an epoxy resin monomer, and the photoinitiator may be a cationic photoinitiator. By performing the polymerization reaction using the epoxy resin monomer and the cationic photoinitiator to generate a polymer network, chiral additives generally required in polymerization reactions are waived.

Here, the epoxy resin monomer may be one or a mixture of several of ethylene glycol diglycidyl ether (EGDE), diglycidyl ether bisphenol F (DGEBF), trimethylolpropane triglycidyl ether (TMPTGE), and pentaerythritol glycidyl ether (PTTGE).

Specifically, the structural formula of EGDE is:

wherein the average value of n is between 3 and 10.

The structural formula of DGEBF is:

wherein the average value of n is between 0 and 3.

The structural formula of TMPTGE is:

The structural formula of PTTGE is:

Here, the cationic photoinitiator may be a UVI-6974 type cationic photoinitiator, which has the structural formula as follows:

Specifically, the copolymer may be an ethylene-vinyl acetate copolymer, which has the structural formula as follows:

The ethylene-vinyl acetate copolymer has a relatively large viscosity, and may well adhere the polymer network layer to the first transparent electrode; and the ethylene-vinyl acetate copolymer has a relatively high molecular weight and is net-like, and may entangle the polymer network.

In an embodiment of the disclosure, the liquid crystal in the polymer network layer may be positive liquid crystal or may be negative liquid crystal.

In addition, the proportion of each component in the polymer network layer may be set according to practical needs. In particular, the proportion of each component will be described in details in the following manufacturing method, and verbose words are omitted herein.

Figure 3:
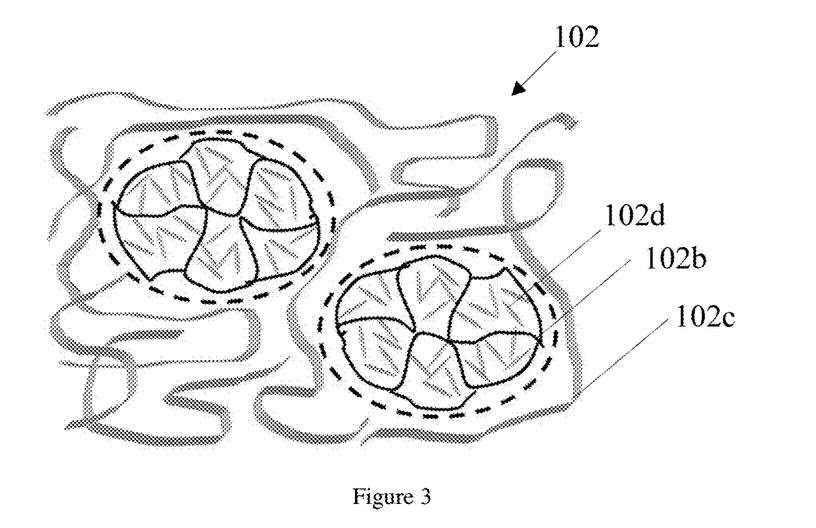
FIG. 3 is a structural schematic diagram of a polymer network layer provided in an embodiment of the disclosure when electricity is not applied.

An embodiment of the disclosure provides a liquid crystal grating, and the structural schematic diagram thereof is the same as the structural schematic diagram of the liquid crystal grating provided in FIG. 1. However, the liquid crystal in the polymer network layer of this liquid crystal grating is positive liquid crystal. As shown in FIG. 3, the polymer network layer 102 comprises positive liquid crystal 102d, a polymer network 102b, and a copolymer 102c. The polymer network 102b allows the positive liquid crystal 102d to be randomly arranged by the anchoring effect.

Figure 4:
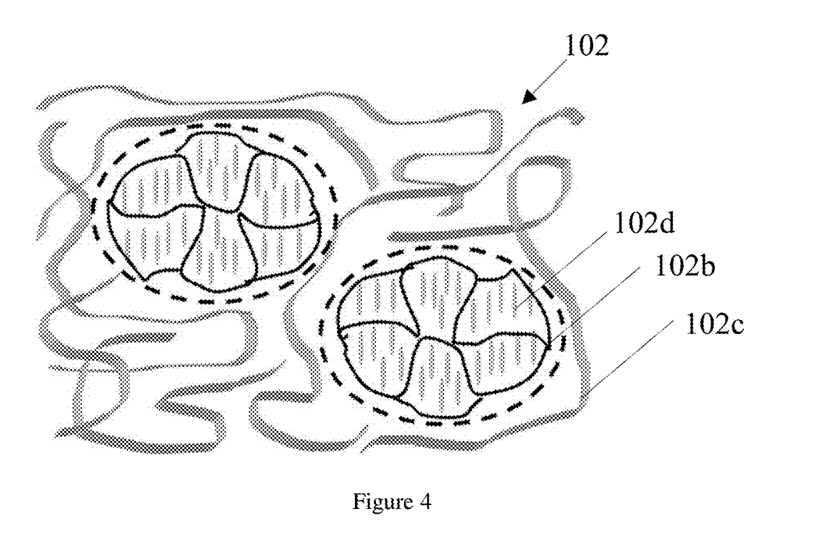
FIG. 4 is a structural schematic diagram of a polymer network layer provided in an embodiment of the disclosure when electricity is applied.

With respect to positive liquid crystal, when voltage is not applied to the liquid crystal grating, the positive liquid crystal 102d exhibits random arrangement. Referring again to FIG. 3, the liquid crystal grating is in opaque state (transmittance approximate to 0%) at this time, and the display apparatus provided with this liquid crystal grating is 3D display. When voltage is applied to the liquid crystal grating, the positive liquid crystal 102d is arranged in the direction of the electric field. With reference to FIG. 4, the liquid crystal grating is in transparent state (transmittance approximate to 100%) at this time, and the display apparatus provided with this liquid crystal grating is 2D display.

Figure 5:
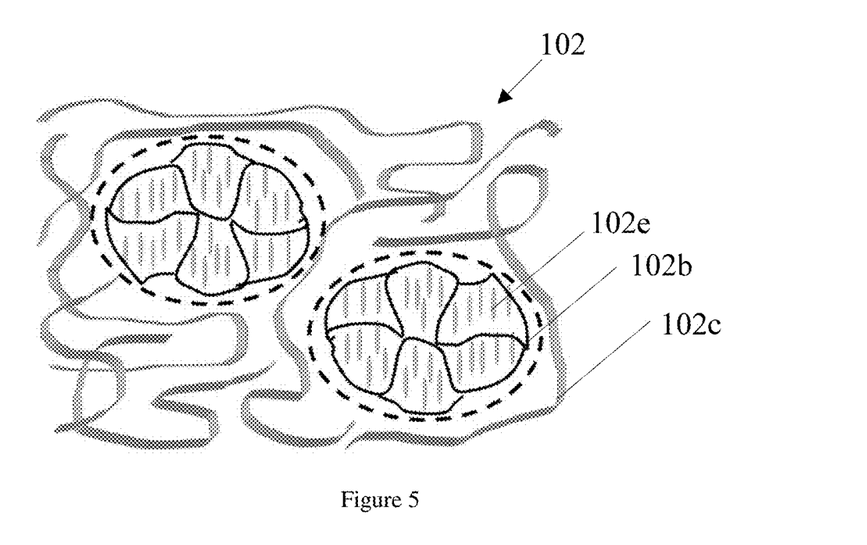
FIG. 5 is a structural schematic diagram of another polymer network layer provided in an embodiment of the disclosure when electricity is not applied.

An embodiment of the disclosure further provides another liquid crystal grating, and the structural schematic diagram thereof is the same as the structural schematic diagram of the liquid crystal grating provided in FIG. 1. However, the liquid crystal in the polymer network layer of this liquid crystal grating is negative liquid crystal. As shown in FIG. 5, the polymer network layer 102 comprises negative liquid crystal 102e, a polymer network 102b, and a copolymer 102c. The polymer network 102b allows the negative liquid crystal 102e to be vertically arranged by the anchoring effect.

Figure 6:
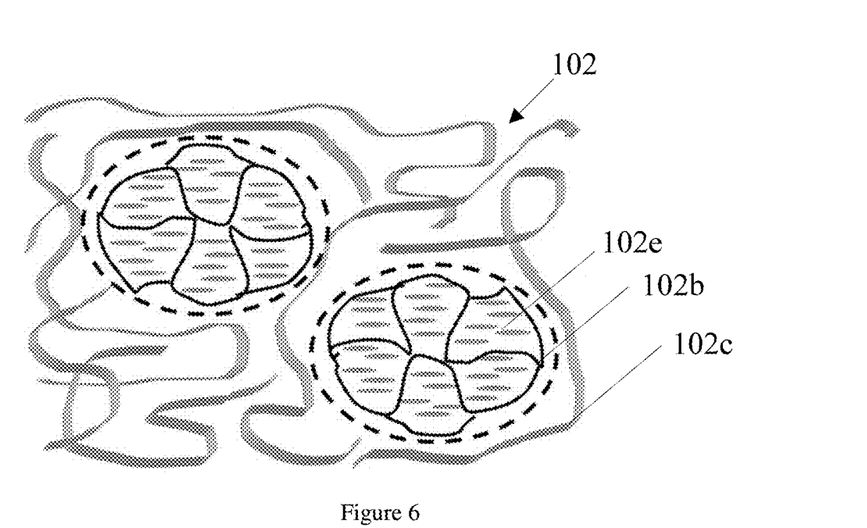
FIG. 6 is a structural schematic diagram of another polymer network layer provided in an embodiment of the disclosure when electricity is applied.

With respect to negative liquid crystal, when voltage is not applied to the liquid crystal grating, the negative liquid crystal 102e is orderly vertically arranged. Referring again to FIG. 5, the liquid crystal grating is in transparent state at this time, and the display apparatus provided with this liquid crystal grating is 2D display. When voltage is applied to the liquid crystal grating, the negative liquid crystal 102e is arranged in the direction vertical to the electric field. With reference to FIG. 6, the liquid crystal grating is in opaque state at this time, and the display apparatus provided with this liquid crystal grating is 3D display. Also, the copolymer therein is optional.

In the liquid crystal grating provided previously, the polymer network layer may have a thickness of 2-20 μm. The polymer network layer of 2-20 μm does not only ensure the performance of the liquid crystal grating, but also ensures the thickness of the liquid crystal grating to be not excessively great.

An embodiment of this the disclosure further provides a barrier type naked-eye 3D display apparatus, which is capable of switching between 2D/3D display modes comprising a display device and a liquid crystal grating of the disclosure.

The liquid crystal grating of the disclosure may be used for a barrier type naked-eye 3D display apparatus, which is capable of switching between 2D/3D display modes as current TN liquid crystal gratings. That is, the liquid crystal grating of the disclosure is manufactured separately, and is superimposed onto a light-outgoing side surface of a display panel. However, it is more preferable to integrally manufacture the grating of the disclosure on a light-outgoing side of a display panel so as to form a naked-eye 3D display apparatus, which is capable of switching between 2D/3D display modes.

Figure 7:
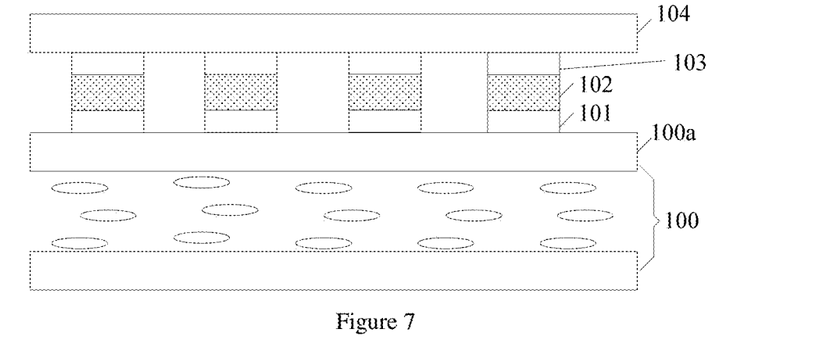
FIG. 7 is a structural schematic diagram of a display apparatus provided in an embodiment of the disclosure.

FIG. 7 shows a schematic structure of such a display apparatus, wherein the liquid crystal grating of the disclosure is integrally formed on the display device 100. In other words, the first substrate 100a of the liquid crystal grating is the light-outgoing side surface of the display device. In the structure of FIG. 7, the supply of an individual substrate may not be required to carry out an individual manufacture of a liquid crystal grating, such that a substrate is waived, the thickness of the liquid crystal grating is reduced, the problem of relatively high loss of transmittance upon 2D display is avoided, and the effect of display is improved.

Here, the display device 100 may be a panel, which may achieve 3D display, such as a liquid crystal display panel, an OLED display panel, etc.

As for other details of the display apparatus, such as circuit design, etc., any common technologies in the art may be used, as long as the effect of the disclosure is not impaired.

Figure 8A:
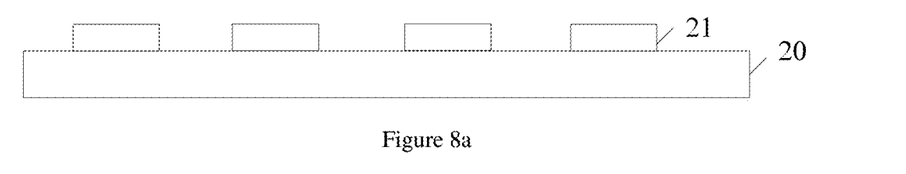
FIG. 8a is a structural schematic diagram after a first transparent electrode is produced in the process of manufacturing a liquid crystal grating provided in an embodiment of the disclosure.

The disclosure provides a method of manufacturing a liquid crystal grating, which may be used for manufacturing the liquid crystal grating described above, and this method comprises:

Step 1): manufacturing a first transparent electrode having a grating structure on a first substrate. As shown in FIG. 8a, a first substrate 20 is manufactured on a first transparent electrode 21.

Here, the first transparent electrode having a grating structure may be manufactured in a manner described below:

laying a transparent electrode layer over the first substrate; and etching off a part of the transparent electrode layer to form a first transparent electrode having a grating structure, which in particular may be a strip electrode or a block electrode.

Figure 8B:
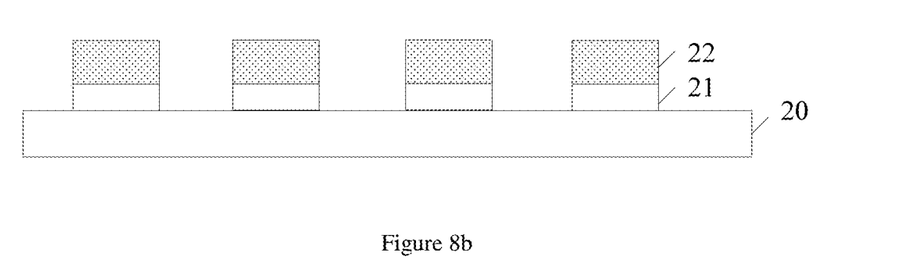
FIG. 8b is a structural schematic diagram after a polymer network layer is produced in the process of manufacturing a liquid crystal grating provided in an embodiment of the disclosure.

Step 2): laying a polymer network layer over the first transparent electrode, wherein the polymer network layer comprises liquid crystal and a polymer network allowing the liquid crystal to arrange in a preset manner by the anchoring effect. As shown in FIG. 8b, a polymer network layer 22 is laying over a first transparent electrode 21. The polymer network layer may further comprise a copolymer used for entangling the polymer network and for adhering the polymer network to the first transparent electrode.

Figure 8C:
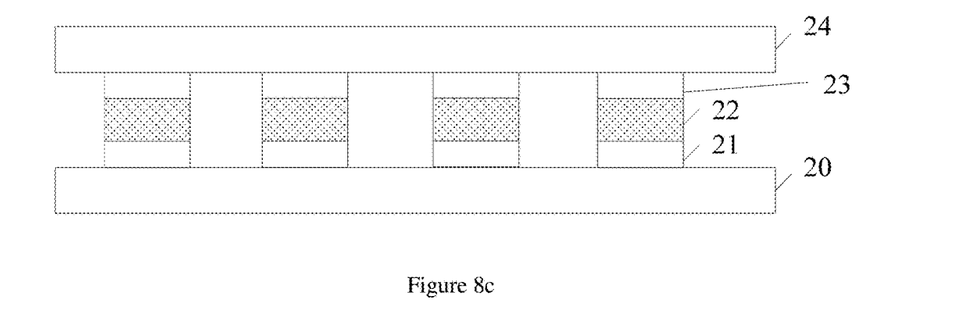
FIG. 8c is a structural schematic diagram after the manufacture of a liquid crystal grating provided in an embodiment of the disclosure is complete.

Step 3): laying a second substrate over the polymer network layer to form a liquid crystal grating, the second substrate having a second transparent electrode provided corresponding to the first transparent electrode on the side toward the polymer network layer. As shown in FIG. 8c, a second substrate 24 is laying over the polymer network layer 22, and the second substrate 24 has a second transparent electrode 23 provided corresponding to the first transparent electrode 21 on the side toward the polymer network layer 22.

Specifically, the second transparent electrode 23, which the second substrate 24 has, may be obtained by performing the manufacture of the transparent electrode on the second substrate 24 in advance. The second transparent electrode may be a strip electrode or a block electrode.

By the steps described above, the liquid crystal grating of the disclosure may be manufactured. Here, the first substrate 20 may be a light-outgoing side surface of a display device. At this time, a liquid crystal grating integrated with the display device is formed, and used as a barrier type naked-eye 3D display apparatus, which is capable of switching between 2D/3D display modes. Here, the display device may be a panel, which may achieve 3D display, such as a liquid crystal display panel, an OLED display panel, etc.

By using the polymer network, which allows the liquid crystal to arrange in a preset manner by the anchoring effect, in this polymer network layer, an embodiment of this the disclosure ensures that the ordering of liquid crystal in the liquid crystal grating may be changed when electricity is applied on and the switch between 3D display and 2D display is achieved. Advantageously, the use of copolymer is for entangling the polymer network described above on the one hand, and for directly adhering the polymer network to a first transparent electrode on the other hand, which increases the fixation between the polymer network and the transparent electrode. More advantageously, the liquid crystal grating of the disclosure is directly and integrally manufactured on a display device, and the supply of a substrate may not be required to carry out an individual manufacture of a liquid crystal grating. Therefore, compared to the prior art, a substrate is waived, and thus the thickness of the liquid crystal grating is reduced, the problem of relatively high loss of transmittance upon 2D display is avoided, and the effect of display is improved.

Figure 9A:
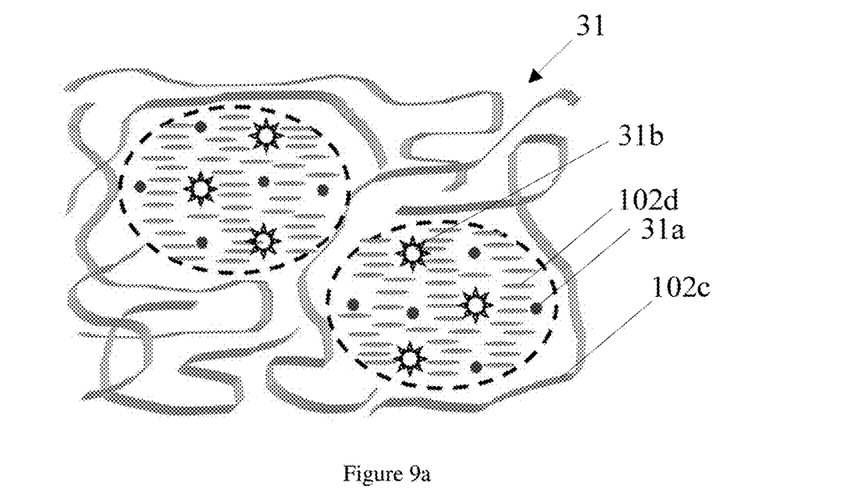
FIG. 9a is a structural schematic diagram of a first mixture coated on a first transparent electrode in the process of manufacturing a liquid crystal grating provided in an embodiment of the disclosure.
Figure 9B:
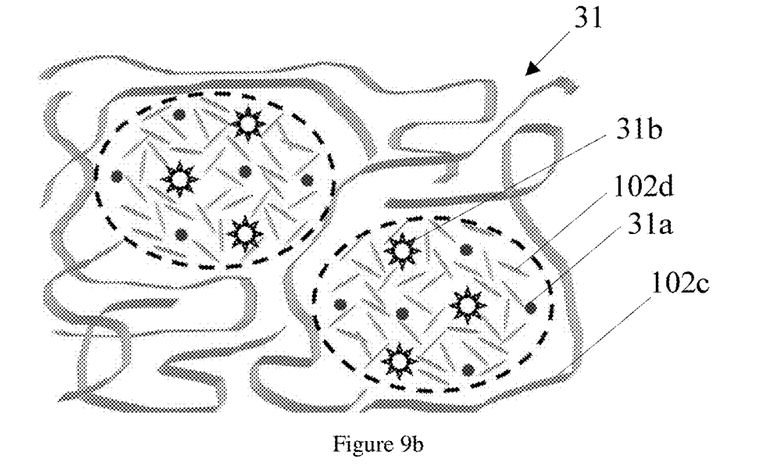
FIG. 9b is a structural schematic diagram of a first mixture provided in an embodiment of the disclosure after heating.

The disclosure provides an example of a method for manufacturing a liquid crystal grating. In this example, positive liquid crystal is used as a raw material, and a copolymer is used in the polymer network layer. Specifically, as shown in FIGS. 9a-9b, this method comprises:

Step 1): manufacturing a first transparent electrode having a grating structure on a first substrate.

Here, the first transparent electrode having a grating structure may be manufactured in a manner described below:

laying a transparent electrode layer over the first substrate; and etching off a part of the transparent electrode layer to form a first transparent electrode having a grating structure, which in particular may be a strip electrode or a block electrode.

Step 2): coating a layer of a first mixture on the first transparent electrode, wherein as shown in FIG. 8a, the first mixture 31 comprises a reactive monomer 31a, a photoinitiator 31b, a positive liquid crystal 102d, and optionally a copolymer 102c.

Furthermore, this method may further comprise manufacturing a first mixture, and specifically comprises:

uniformly mixing a reactive monomer, a photoinitiator, and a positive liquid crystal to obtain a second mixture, wherein the masses of reactive monomer, the photoinitiator, and the positive liquid crystal constitute 20-60%, 3-5%, and 35-77% of the mass of the second mixture, respectively; and uniformly mixing the second mixture and a copolymer at a mass ratio of 3/7-2/8 to obtain the first mixture. By manufacturing the first mixture according to the proportions of respective substances described above, the formation of the polymer network can be ensured to anchor the arrangement of positive liquid crystal, while it ensures that the polymer network is adhered to the substrate by the copolymer.

In particular implementation, the proportions of respective substances may be selected according to practical needs. For example, the proportions of the reactive monomer, the photoinitiator, and the positive liquid crystal may be 55%/5%/40% or 45%/5%/50%, etc. The second mixture and the copolymer follow a mass ratio of 7/3, 4/6, or the like.

Here, the reactive monomer may be an epoxy resin monomer, and the photoinitiator may be a cationic photoinitiator. By performing the polymerization reaction using the epoxy resin monomer and the cationic photoinitiator to generate a polymer network, chiral additives generally required in polymerization reactions are waived.

Furthermore, the epoxy resin monomer may be one or a mixture (for example, a mixture of EGDE and DGEBF) of several of ethylene glycol diglycidyl ether (EGDE), diglycidyl ether bisphenol F (DGEBF), trimethylolpropane triglycidyl ether (TMPTGE), and pentaerythritol glycidyl ether (PTTGE). The cationic photoinitiator may be a UVI-6974 type cationic photoinitiator.

Here, the copolymer may be an ethylene-vinyl acetate copolymer. The ethylene-vinyl acetate copolymer has a relatively large viscosity, and may well adhere the polymer network layer to the first transparent electrode; and the ethylene-vinyl acetate copolymer has a relatively high molecular weight and is net-like, and may entangle the polymer network.

Additionally, in an embodiment of this the disclosure, the polymer network layer may have a thickness of 2-20 μm. The polymer network layer of 2-20 μm does not only ensure the performance of the liquid crystal grating, but also ensures the thickness of the liquid crystal grating to be not excessively great.

Step 3): heating the first substrate coated with the first mixture to a clear point temperature of the positive liquid crystal or more (such as 50° C.) to allow the positive liquid crystal to be randomly arranged, as shown in FIG. 8b.

Step 4): irradiating the first mixture with ultraviolet to allow an ionic polymerization reaction of a reactive monomer and a photoinitiator to form a polymer network, so as to anchor the arrangement of the positive liquid crystal to obtain the polymer network layer. The schematic structure of the polymer network can be seen in FIG. 3, and verbose words are omitted herein.

Specifically, irradiating the first mixture with ultraviolet may comprise:

irradiating the first mixture with ultraviolet having a light irradiation intensity of 3-25 mW/cm$^2$ for 20-40 min. Therefore, sufficient ionic polymerization reaction may be ensured after light irradiation to better anchor liquid crystal. Here, with respect to light irradiation intensity and light irradiation time, preferable values may be selected from the range described above according to practical needs, such as 5 mW/cm$^2$ and 30 min. After the irradiation is complete, the temperature of the first mixture is reduced to room temperature, and then subsequent steps are performed.

Step 5): laying a second substrate over the polymer network layer to form a liquid crystal grating, the second substrate having a second transparent electrode provided corresponding to the first transparent electrode on the side toward the polymer network layer.

The disclosure provides another example of a method for manufacturing a liquid crystal grating. In this method, negative liquid crystal is used as a raw material, and a copolymer is used in the polymer network layer. Specifically, as shown in FIG. 9, this method comprises:

Step 1): manufacturing a first transparent electrode having a grating structure on a first substrate.

Here, the first transparent electrode having a grating structure may be manufactured in a manner described below:

laying a transparent electrode layer over the first substrate; and etching off a part of the transparent electrode layer to form a first transparent electrode having a grating structure, which in particular may be a strip electrode or a block electrode.

Step 2): coating a layer of a vertical orientating agent on the first transparent electrode. The vertical orientating agent may be those liquid crystal vertical orientating agents known in the art.

Figure 10:
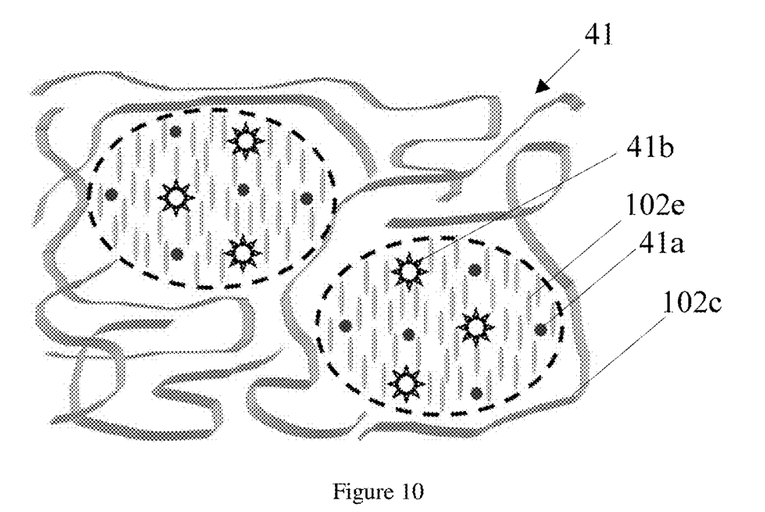
FIG. 10 is a structural schematic diagram of a third mixture coated on a first transparent electrode in the process of manufacturing a liquid crystal grating provided in an embodiment of the disclosure.

Step 3): coating a layer of a third mixture on the first transparent electrode coated with a vertical orientating agent, wherein as shown in FIG. 10, the third mixture 41 comprises a reactive monomer 41a, a photoinitiator 41b, a negative liquid crystal 102e, and optionally a copolymer 102c.

Furthermore, this method may further comprise manufacturing a third mixture, and specifically comprises:

uniformly mixing a reactive monomer, a photoinitiator, and a negative liquid crystal to obtain a fourth mixture, wherein the masses of reactive monomer, the photoinitiator, and the negative liquid crystal constitute 20-60%, 3-5%, and 35-77% of the mass of the fourth mixture, respectively; and uniformly mixing the fourth mixture and a copolymer at a mass ratio of 3/7-2/8 to obtain the third mixture. By manufacturing the third mixture according to the proportions of respective substances described above, the formation of the polymer network can be ensured to anchor the orderly vertical arrangement of negative liquid crystal, while it ensures that the polymer network is adhered to the substrate by the copolymer.

In particular implementation, the proportions of respective substances may be selected according to practical needs. For example, the proportions of the reactive monomer, the photoinitiator, and the negative liquid crystal may be 35%/5%/60%. The second mixture and the copolymer follow a mass ratio of 7/3.

Here, the reactive monomer may be an epoxy resin monomer, and the photoinitiator may be a cationic photoinitiator. By performing the polymerization reaction using the epoxy resin monomer and the cationic photoinitiator to generate a polymer network, chiral additives generally required in polymerization reactions are waived.

Furthermore, the epoxy resin monomer may be one or a mixture of several of ethylene glycol diglycidyl ether (EGDE), diglycidyl ether bisphenol F (DGEBF), trimethylolpropane triglycidyl ether (TMPTGE), and pentaerythritol glycidyl ether (PTTGE). The cationic photoinitiator may be a UVI-6974 type cationic photoinitiator.

Here, the copolymer may be an ethylene-vinyl acetate copolymer. The ethylene-vinyl acetate copolymer has a relatively large viscosity, and may well adhere the polymer network layer to the first transparent electrode; and the ethylene-vinyl acetate copolymer has a relatively high molecular weight and is net-like, and may entangle the polymer network.

Additionally, in an embodiment of this the disclosure, the polymer network layer may have a thickness of 2-20 μm. The polymer network layer of 2-20 μm does not only ensure the performance of the liquid crystal grating, but also ensures the thickness of the liquid crystal grating to be not excessively great.

Step 4): irradiating the third mixture with ultraviolet to allow an ionic polymerization reaction of a reactive monomer and a photoinitiator to form a polymer network, so as to anchor the arrangement of the negative liquid crystal to obtain the polymer network layer. The structure of the polymer network can be seen in FIG. 5, and verbose words are omitted herein.

Specifically, irradiating the first mixture with ultraviolet may comprise:

irradiating the third mixture with ultraviolet having a light irradiation intensity of 3-25 mW/cm$^2$ for 20-40 min. Therefore, sufficient ionic polymerization reaction may be ensured after light irradiation to better anchor liquid crystal. Here, with respect to light irradiation intensity and light irradiation time, preferable values may be selected from the range described above according to practical needs, such as 5 mW/cm$^2$ and 30 min. After the irradiation is complete, the temperature of the third mixture is reduced to room temperature, and then subsequent steps are performed.

Step 5): laying a second substrate over the polymer network layer to form a liquid crystal grating, the second substrate having a second transparent electrode provided corresponding to the first transparent electrode on the side toward the polymer network layer.

Figure 11:
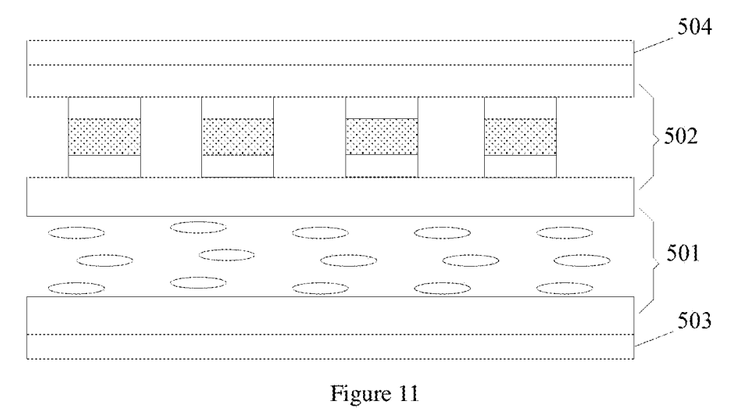
FIG. 11 is a structural schematic diagram of a display apparatus provided in an embodiment of the disclosure.

More specifically, FIG. 11 provides a structural schematic diagram of a liquid crystal display apparatus. With reference to FIG. 11, this display apparatus comprises: a liquid crystal display panel 501, a liquid crystal grating 502 of the disclosure provided on the liquid crystal display panel 501, a first polarizer 503 and a second polarizer 504, and the liquid crystal display panel 501 and the liquid crystal grating 502 are sandwiched between the first polarizer 503 and the second polarizer 504. Here, the first substrate of the liquid crystal grating is a light-outgoing side surface of the liquid crystal display panel. This liquid crystal display apparatus according to the invention has a production process with excellent compatibility with the production process of current liquid crystal display panels, and has an integrated thin liquid crystal grating, such that a substrate is waived, a better display effect is obtained, and the cost and the product weight are reduced.

Of course, this display apparatus also comprises outer frames of conventional display apparatus.

By using the polymer network, which allows the liquid crystal to arrange in a preset manner by the anchoring effect, in this polymer network layer, an embodiment of this the disclosure ensures that the ordering of liquid crystal in the liquid crystal grating may be changed when electricity is applied and the switch between 3D display and 2D display is achieved. Advantageously, the use of copolymer is for entangling the polymer network described above on the one hand, and for directly adhering the polymer network to a first transparent electrode on the other hand, which increases the fixation between the polymer network and the transparent electrode. More advantageously, the liquid crystal grating of the disclosure is suitable to be directly and integrally manufactured on a display device, and the supply of an individual substrate may not be required to carry out an individual manufacture of a liquid crystal grating, Therefore, a substrate is waived, and thus the thickness of the liquid crystal grating is reduced, the problem of relatively high loss of transmittance upon 2D display is avoided, and the effect of display is improved.

Those described above are merely preferred embodiments of the disclosure, and are not intended to limit the disclosure. All of modifications, equivalent replacements, improvements, and the like, which are within the spirit and the principle of the disclosure, should be encompassed in the scope protected by the disclosure.

What is claimed is:

1. A liquid crystal grating used for a naked-eye 3D display apparatus, wherein the liquid crystal grating comprises:
   a first transparent electrode having a grating structure formed on a first substrate, a polymer network layer laying over the first transparent electrode, and a second substrate laying over the polymer network layer, wherein the second substrate has a second transparent electrode provided corresponding to the first transparent electrode on a side toward the polymer network layer;
   wherein the polymer network layer comprises liquid crystal and a polymer network allowing the liquid crystal to arrange in a preset manner by an anchoring effect;
   wherein the polymer network is a polymer network formed by polymerization of a reactive monomer and a photoinitiator.

2. The liquid crystal grating according to claim 1, wherein the reactive monomer is an epoxy resin monomer, and the photoinitiator is a cationic photoinitiator.

3. The liquid crystal grating according to claim 2, wherein the epoxy resin monomer is one of or a mixture of several of ethylene glycol diglycidyl ether, diglycidyl ether bisphenol F, trimethylolpropane triglycidyl ether, and pentaerythritol glycidyl ether.

4. The liquid crystal grating according to claim 1, wherein the polymer network layer further comprises a copolymer used for entangling the polymer network and adhering the polymer network to the first transparent electrode.

5. The liquid crystal grating according to claim 4, wherein the copolymer is an ethylene-vinyl acetate copolymer.

6. The liquid crystal grating according to claim 1, wherein the liquid crystal is positive liquid crystal, and the polymer network allows the positive liquid crystal to be randomly arranged by the anchoring effect; or
   the liquid crystal is negative liquid crystal, and the polymer network allows the negative liquid crystal to be vertically arranged by the anchoring effect.

7. The liquid crystal grating according to claim 1, wherein the polymer network layer has a thickness of 2-20 μm.

8. A barrier type naked-eye 3D display apparatus, which is capable of switching between 2D/3D display modes, wherein the display apparatus comprises a display device and the liquid crystal grating according to claim 1 on the display device.

9. The naked-eye 3D display apparatus according to claim 8, wherein the first substrate of the liquid crystal grating is the light-outgoing side surface of the display device.

10. The naked-eye 3D display apparatus according to claim 9, wherein the display is a liquid crystal panel, wherein the display apparatus further comprises a first polarizer and a second polarizer, and the liquid crystal panel and the liquid crystal grating are sandwiched between the first polarizer and second polarizer.

11. A method of manufacturing a liquid crystal grating, wherein the method comprises:
   manufacturing a first transparent electrode having a grating structure on a first substrate;
   laying a polymer network layer over the first transparent electrode, wherein the polymer network layer comprises liquid crystal and a polymer network allowing the liquid crystal to arrange in a preset manner by an anchoring effect, wherein the polymer network is formed by polymerization of a reactive monomer and a photoinitiator; and
   laying a second substrate over the polymer network layer to form a liquid crystal grating, wherein the second substrate has a second transparent electrode provided corresponding to the first transparent electrode on the side toward the polymer network layer.

12. The method according to claim 11, wherein the laying a polymer network layer over the first transparent electrode comprises:
   coating a layer of a first mixture on the first transparent electrode, which comprises a reactive monomer, a photoinitiator, a positive liquid crystal, and optionally a copolymer;
   heating the first substrate coated with the first mixture to the clear point temperature of the positive liquid crystal or more to allow the positive liquid crystal to be randomly arranged; and
   irradiating the first mixture with ultraviolet to allow an ionic polymerization reaction of a reactive monomer and a photoinitiator to form a polymer network, so as to anchor the arrangement of the positive liquid crystal to obtain the polymer network layer.

13. The method according to claim 12, wherein the irradiating the first mixture with ultraviolet comprises:
    irradiating the first mixture with ultraviolet having a light irradiation intensity of 3-25 mW/cm$^2$ for 20-40 min.

14. The method according to claim 12, further comprising:
    uniformly mixing a reactive monomer, a photoinitiator, and a positive liquid crystal to obtain a second mixture, wherein the masses of reactive monomer, the photoinitiator, and the positive liquid crystal constitute 20-60%, 3-5%, and 35-77% of the mass of the second mixture, respectively; and
    uniformly mixing the second mixture and a copolymer at a mass ratio of 3/7-2/8 to obtain the first mixture.

15. The method according to claim 11, wherein the laying a polymer network layer over the first transparent electrode comprises:
    coating a layer of a vertical orientating agent on the first transparent electrode;
    coating a layer of a third mixture on the first transparent electrode coated with a vertical orientating agent, wherein the third mixture comprises a reactive monomer, a photoinitiator, a negative liquid crystal, and optionally a copolymer; and
    irradiating the third mixture with ultraviolet to allow an ionic polymerization reaction of a reactive monomer and a photoinitiator to form a polymer network, so as to anchor the vertical arrangement of the negative liquid crystal to obtain the polymer network layer.

16. The method according to claim 15, wherein the irradiating the third mixture with ultraviolet comprises:
    irradiating the third mixture with ultraviolet having a light irradiation intensity of 3-25 mW/cm$^2$ for 20-40 min.

17. The method according to claim 15, wherein the method further comprises:
    uniformly mixing a reactive monomer, a photoinitiator, and a negative liquid crystal to obtain a fourth mixture, wherein the masses of reactive monomer, the photoinitiator, and the negative liquid crystal constitute 20-60%, 3-5%, and 35-77% of the mass of the fourth mixture, respectively; and
    uniformly mixing the fourth mixture and a copolymer at a mass ratio of 3/7-2/8 to obtain the third mixture.

18. The method according to claim 11, wherein the reactive monomer is an epoxy resin monomer, and the photoinitiator is a cationic photoinitiator.

19. The method according to claim 18, wherein the epoxy resin monomer is one or a mixture of several of ethylene glycol diglycidyl ether, diglycidyl ether bisphenol F, trimethylolpropane triglycidyl ether, and pentaerythritol glycidyl ether, and the copolymer is an ethylene-vinyl acetate copolymer.

20. The method according to claim 11, wherein the first substrate is a light-outgoing side surface of a display device to allow the liquid crystal grating and the display device to integrally form a barrier type naked-eye 3D display apparatus, which is capable of switching between 2D/3D display modes.

* * * * *